US012287844B1

(12) United States Patent
Zeng et al.

(10) Patent No.: US 12,287,844 B1
(45) Date of Patent: Apr. 29, 2025

(54) MATRIX MULTIPLICATION HARDWARE ARCHITECTURE

(71) Applicant: SHANGHAI INFINIGENCE AI INTELLIGENT TECHNOLOGY CO., LTD., Shanghai (CN)

(72) Inventors: Shulin Zeng, Shanghai (CN); Shengen Yan, Shanghai (CN); Jintao Li, Shanghai (CN); Yadong Dai, Shanghai (CN); Kairui Wen, Shanghai (CN)

(73) Assignee: SHANGHAI INFINIGENCE AI INTELLIGENT TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/896,556

(22) Filed: Sep. 25, 2024

(30) Foreign Application Priority Data

Dec. 18, 2023 (CN) .......................... 202311738376.8

(51) Int. Cl.
*G06F 17/16* (2006.01)
*G06F 15/80* (2006.01)

(52) U.S. Cl.
CPC .......... *G06F 17/16* (2013.01); *G06F 15/8053* (2013.01)

(58) Field of Classification Search
CPC .............................. G06F 17/16; G06F 15/8053
See application file for complete search history.

(56) References Cited

U.S. PATENT DOCUMENTS

| 8,706,793 B1 * | 4/2014 | Young ................... G06F 7/5324 708/620 |
| 2007/0255855 A1 | 11/2007 | Knapp et al. |
| 2019/0102338 A1 | 4/2019 | Tang et al. |

FOREIGN PATENT DOCUMENTS

| CN | 102073481 A | 5/2011 |
| CN | 102422259 A | 4/2012 |
| CN | 103955447 A | 7/2014 |
| CN | 104407836 A | 3/2015 |
| CN | 104572011 A | 4/2015 |
| CN | 105830031 A | 8/2016 |
| CN | 110852416 A | 2/2020 |
| CN | 114327620 A | 4/2022 |

(Continued)

OTHER PUBLICATIONS

Joseph Szurley et al., "Topology-Independent Distributed Adaptive Node-Specific Signal Estimation in Wireless Sensor Networks", IEEE Transactions on Signal and Information Processing over Networks 3.1 Oct. 2016, 16 pages.
Extended European Search Report of EP application No. 24204875. 9, mailing date: Feb. 6, 2025, 8 pages.

(Continued)

*Primary Examiner* — Michael D. Yaary
(74) *Attorney, Agent, or Firm* — FisherBroyles, LLP

(57) ABSTRACT

A matrix multiplication hardware architecture is provided, including: a reduction network, including a tree topology with multiple levels formed by a plurality of reduction network nodes, where the reduction network node includes a data selector and two computation paths; and a digital signal processing unit DSP48 chain, formed by cascading a plurality of digital signal processing units DSP48, where output ends of adjacent digital signal processing units DSP48 are respectively connected to two computation paths of a same reduction network node in a first level of the tree topology, and outputs of two computation paths pass through a data selector and then are connected to a reduction network nodes in an upper level of the tree topology.

9 Claims, 2 Drawing Sheets

(56) References Cited

FOREIGN PATENT DOCUMENTS

Figure 1:
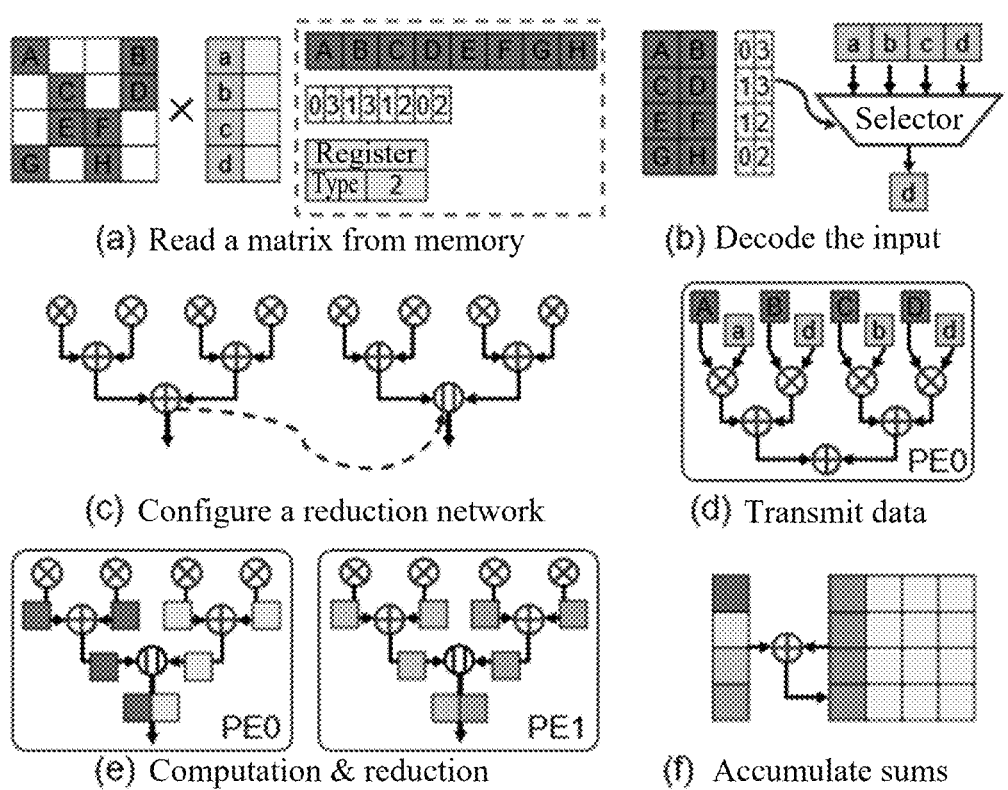

| | | |
|---|---|---|
| CN | 115310037 A | 11/2022 |
| CN | 117083614 A | 11/2023 |

OTHER PUBLICATIONS

Xilinx: "UltraScale Architecture DSP Slice—User Guide", Jun. 4, 2018, XP093241974, Retrieved from the Internet: URL:https://0x04.net/~mwk/xidocs/ug/ug579-ultrascale-dsp.pdf, 75 pages.

Jindong Li, et al. "FireFly: A High-Throughput Hardware Accelerator for Spiking Neural Networks with Efficient DSP and Memory Optimization", Arxiv.Org, Cornell University Library, Apr. 14, 2023, 15 pages.

\* cited by examiner

US 12,287,844 B1

MATRIX MULTIPLICATION HARDWARE ARCHITECTURE

CROSS REFERENCE TO RELATED APPLICATION

This application claims priority to Chinese Patent Application No. 202311738376.8, filed on Dec. 18, 2023, the contents of which are hereby incorporated by reference in their entirety for all purposes.

TECHNICAL FIELD

The present disclosure pertains to the technical field of digital signal processing, and in particular, to a matrix multiplication hardware architecture.

BACKGROUND

In large language models based on the Transformer algorithm, general matrix multiplication (GEMM) is widely used in solving a complex physical system, computing current distribution in circuits and analyzing engineering problems, multi-dimensional data processing, social network analysis, movie recommendation systems, transportation planning and management, and other technical fields. The GEMM is the most important and time-consuming operation. To reduce the computational load and improve the computational efficiency, a computation optimization method such as sparsification could be employed and an efficient hardware architecture could be designed to accelerate the matrix multiplication operation. Sparsification has become a widely used GEMM acceleration method, and there has been an implementation of a relevant dedicated hardware architecture.

SUMMARY

In view of the problems in the related art, the present disclosure provides a matrix multiplication hardware architecture, so as to greatly save resources and optimize timing.

An embodiment of the present disclosure provides a matrix multiplication hardware architecture, including:
- a reduction network, including a tree topology with multiple levels formed by a plurality of reduction network nodes, where the reduction network node includes a data selector and two computation paths; and
- a digital signal processing unit DSP48 chain, formed by cascading a plurality of digital signal processing units DSP48, where output ends of adjacent digital signal processing units DSP48 are respectively connected to two computation paths of a same reduction network node in a first level of the tree topology, and outputs of two computation paths pass through a data selector and then are connected to a reduction network node in an upper level of the tree topology.

BRIEF DESCRIPTIONS OF THE DRAWINGS

Figure 2:
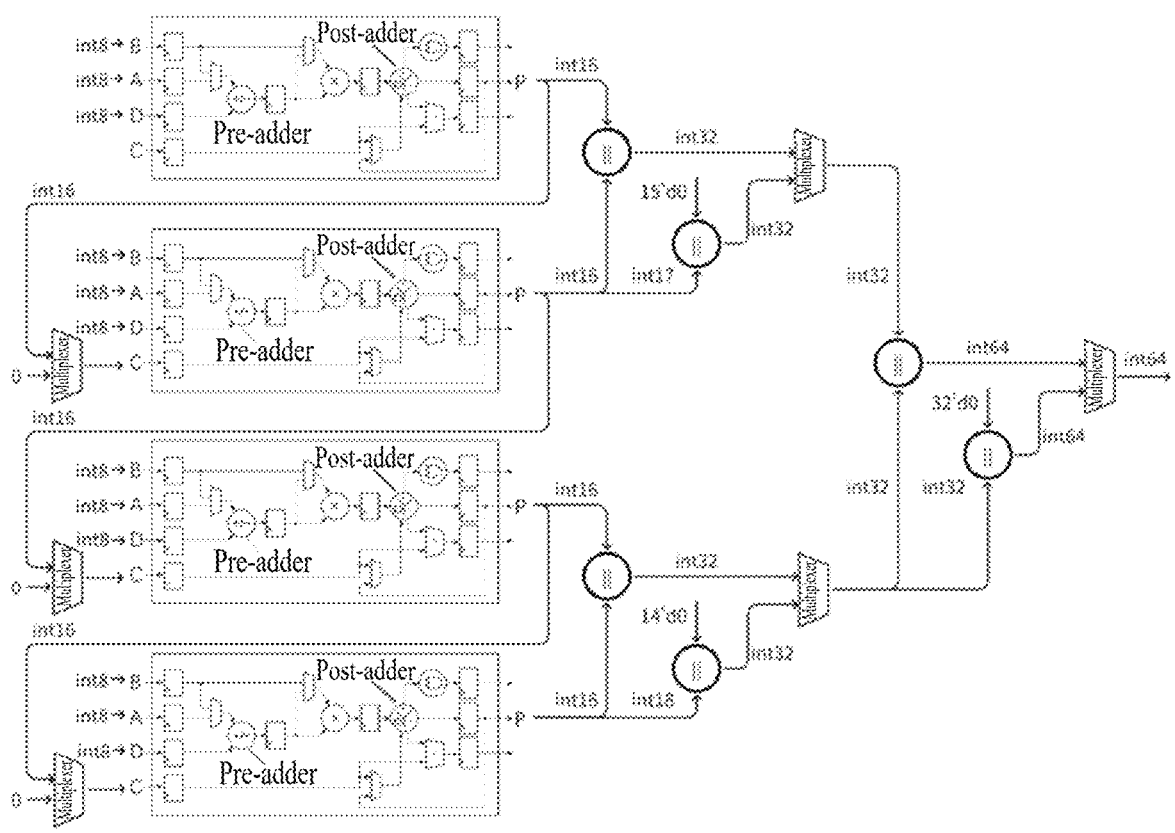

Embodiments of the present disclosure are described in detail below with reference to the drawings. The shown elements are not limited by the scale shown in the drawings. The same or similar reference numerals in the drawings indicate the same or similar elements. In the drawings:

FIG. 1 is a schematic diagram of a flexible sparse block hardware computing architecture in the related art; and FIG. 2 is a schematic diagram of a matrix multiplication hardware architecture according to an embodiment of the present disclosure.

DETAILED DESCRIPTION OF THE EMBODIMENTS

To make the objectives, technical solutions and advantages of the present disclosure clearer, the present disclosure will be further described in detail below with reference to the specific embodiments and the drawings. Herein, example embodiments and description of the present disclosure are intended to explain the present disclosure, but are not intended to limit the present disclosure.

The term "include/comprise" used herein and its variants mean open inclusion, that is, "including but not limited to". Unless otherwise stated, the term "or" means "and/or". The term "based on" means "at least partially based on". The terms "an example embodiment" and "an embodiment" mean "at least one example embodiment". The term "another embodiment" means "at least one another embodiment". The terms "first", "second", etc. may refer to different or the same objects. Other explicit and implicit definitions may also be included below.

For a matrix with flexible sparsity that takes a block as the basic unit, an existing flexible sparse block (FSB) hardware computing architecture includes a plurality of multipliers and a dynamic extensible reduction network, where the dynamic extensible reduction network includes an adder tree and a configuration logic. As shown in FIG. 1, FIG. 1(a) shows a process of reading an array from memory in the flexible sparse block hardware computing architecture, including the steps of defining a memory address, loading array data, reading the array data, and processing the array data, where a register is used in the step of defining the memory address to store binary code; FIG. 1(b) shows a decoding input process of the flexible sparse block hardware computing architecture, where the decoding input refers to decoding the input signal or data to extract useful information or data therein, and includes the steps of receiving input data, parsing a data format, decoding the data, and filtering or transforming the decoded data using a selector; FIG. 1(c) shows a reduction network configuration process of the flexible sparse block hardware computing architecture, which implements data transmission and optimization based on a predetermined network topology; FIG. 1(d) shows a data transmission process of the flexible sparse block hardware computing architecture, which also implements hierarchical multi-path time-division data transmission based on the predetermined network topology and needs to consider factors such as the use of hardware resources and energy consumption; FIG. 1(e) shows a computation and reduction process of the flexible sparse block hardware computing architecture, which employs a vector-matrix multiplication and a reduction method based on a tree structure; and FIG. 1(f) shows a sum accumulation process of the flexible sparse block hardware computing architecture.

Depending on the sparsity of the current block, each layer of reduction node is configured to perform an addition or forward propagation function, that is, the selector selects one of the adder result and the bitwise concatenation result for output.

The hardware computing architecture, such as FSB, in the related art has the following disadvantages:

Hardware optimization to a field-programmable gate array (FPGA) is insufficient in that: the adder tree structure has low computational efficiency; and a large quantity of FPGA sources are consumed. When the hardware parallelism is p, a computation unit requires p multipliers and $(p/2^1+p/2^2+p/2^3+ \ldots +1)$ adders. To accelerate the inference process of a large language model, a plurality of computation units could be repeatedly set to achieve higher computational efficiency, which will consume a large number of limited look-up table (LUT) resources in the FPGA.

FIG. 2 shows a matrix multiplication hardware architecture according to an embodiment of the present disclosure. As shown in FIG. 2, the matrix multiplication hardware architecture according to the present disclosure includes:

a reduction network, including a tree topology with multiple levels formed by a plurality of reduction network nodes, where the reduction network node includes a data selector and two computation paths; and a digital signal processing unit DSP48 chain, formed by cascading a plurality of digital signal processing units DSP48, where output ends of adjacent digital signal processing units DSP48 are respectively connected to two computation paths of a same reduction network node in a first level of the tree topology, and outputs of the two computation paths pass through the data selector and then are connected to a reduction network node in an upper level of the tree topology.

Compared with the related art, the present disclosure has the following beneficial technical effects:

According to the present application, an addition tree of FSB is changed to an addition chain adapted to the DSP48 structure, thereby reusing a post-adder of the DSP48 and improving hardware utilization. Meanwhile, the hardware architecture of the present application can change a higher-bit sign bit extension to zero padding, thereby greatly saving resources and optimizing timing.

It should be noted that the multi-level tree topological structure in this embodiment is a local area network topology similar to a bus topology, which includes a tree structure and has characteristics of the tree structure. In the tree topology, the tree network may include branches, and each branch may further include a plurality of reduction network nodes. The tree topology is an expanded form of the bus topology, and a transmission medium is an unclosed branch circuit.

The tree topology has a root node and branch nodes, and is suitable for a hierarchical structure, especially a hierarchical management system with primary and secondary levels. The characteristics of the tree topology are the same as those of the bus topology. One station sends data, and all the other stations can receive the data. In addition, the tree topology has strong scalability and can effectively protect wiring investment.

In this embodiment, a plurality of multiplexers (MUX) are present in both the multi-level tree topological structure and the cascade of the digital signal processing units DSP48. As shown in FIG. 2, the multiplexers are used for data signal processing and transfer between upper and lower levels of digital signal processing units DSP48 and between the reduction network nodes. Specifically, the multiplexer (MUX) is a multiplexer for combining inputs of a plurality of signals into an output line. The multiplexer (MUX) has a set of specific input ends, each of which may have one or more input signals or may have no signal; one select end, which needs to select an input signal in advance; and a set of output ends. The multiplexer (MUX) has one output port. All the signals are combined into the output port. The MUX outputs the selected input signal, and all the others will be ignored. The main working principle of the multiplexer (MUX) is as follows: When signals are input at the input ends, the corresponding input signals are combined to the output end according to an input selection signal, and signals at all the other input ends will be ignored. Therefore, the multiplexer (MUX) can effectively combine the plurality of signals to save resources of the output line and reduce the cost of the system.

In this embodiment, the digital signal processing unit DSP48 includes four input ports for receiving sparse matrix data and dense matrix data, and an output port, where the output port is connected to an adjacent cascaded digital signal processing unit DSP48. Specifically, the DSP48 includes the four input ports, namely:

an input port B, an input port A, and an input port D for receiving the sparse matrix data and the dense matrix data, and an input port C for connecting to an output end of a digital signal processing unit DSP48 in a previous stage of the digital signal processing unit DSP48 chain; and an output port P for connecting to an input end of a digital signal processing unit DSP48 in a next stage of the digital signal processing unit DSP48 chain.

Further specifically, in this embodiment, for the used DSP48, the input port B has a width of 18 bits, the input port A has a width of 30 bits, and the input port D is a pre-adder D data port with a width of 25 bits.

In this embodiment, a pre-adder and a post-adder are arranged inside the digital signal processing unit DSP48, where a plurality of sets of logic circuits are arranged on an input side and an output side of the pre-adder, and a plurality of sets of logic circuits are arranged on an input side and an output side of the post-adder. Specifically, the plurality of sets of logic circuits include:

a logic circuit for connecting two output ports of the digital signal processing unit DSP48 and connecting to the pre-adder;

a logic circuit for connecting another output port of the digital signal processing unit DSP48 and connecting to the post-adder which is connected to an output end of the pre-adder; and a logic circuit for the output ends of the digital signal processing unit DSP48.

Specifically, the logic circuit usually includes an input interface, an operation unit, a control logic, an output interface, and the like. The input interface is responsible for receiving a data signal input from the outside and converting the data signal into a format suitable for internal operation. The operation unit, as a core part of the digital signal processing unit DSP48, includes a multiplier, an adder, a shifter, and the like, and is configured to perform various digital signal processing algorithms. The control logic is responsible for controlling a workflow of the operation unit and ensuring a correct operation sequence and result output. The output interface is responsible for outputting the processed data signal to an external device or memory. In addition, the logic circuits of the digital signal processing unit DSP48 also need to consider an interface and a communication protocol with the external device, so as to ensure correction communication and data transmission with the external device.

In this embodiment, the digital signal processing unit DSP48 is configured to be capable of simultaneously computing a plurality of 8-bit multiplications. It should be noted that a plurality of multipliers are usually integrated into the digital signal processing unit DSP48, the multipliers can simultaneously perform a plurality of 8-bit multiplication operations, and when the multiplication operations are performed, the digital signal processing unit DSP48 multiplies the input data respectively by coefficients in the multipliers and accumulate the results. Since the multipliers work in parallel, the plurality of multiplication operations can be processed simultaneously, so that the plurality of 8-bit multiplications can be implemented simultaneously.

In this embodiment, a parallelism of the digital signal processing unit DSP48 in the digital signal processing unit DSP48 chain is an integer multiple of 4, and each parallelism supports matrix multiplication computation with a plurality of sparsity formats. Specifically, the digital signal processing unit DSP48 in the digital signal processing unit DSP48 chain may include 4, 8, or 16 parallel DSPs, that is, the parallelism of the digital signal processing unit DSP48 is 4, 8, or 16. A computation unit with each DSP parallelism may support matrix multiplication computation with various sparsity formats. For example, the computation unit with the DSP parallelism of 16 may support sparse matrix computation of 1:16, 2:16, 4:16, and 8:16, and may also complete the dense matrix multiplication.

In this embodiment, the two computation paths are respectively used for an addition operation and a concatenation function of the reduction network node on input data. Specifically, the addition operation of the computation path has an accumulation function and a filtering function as follows:

Accumulation function: In digital signal processing, accumulation is a common operation for computing a sum or average value of signals. The digital signal processing unit DSP48 can perform an accumulation operation on the input data through the addition operation so as to obtain the required result.

Filtering function: The addition operation plays a key role in a digital filter. Through an addition operation on the input data and a coefficient of the filter, the digital signal processing unit DSP48 can implement filtering on a signal, and remove noise or extract specific frequency components.

The concatenation function of the computation path has functions of data combination and resolution improvement as follows:

Data combination: The concatenation function can combine a plurality of pieces of input data into a larger data block, which is very useful when segmented signals are processed or the plurality of signals are combined into one signal. Through the concatenation operation, the digital signal processing unit DSP48 can process a longer data sequence so as to improve the processing efficiency.

Resolution improvement: Resolution of the data can be increased by concatenation the plurality of pieces of input data, which is particularly important in image processing, audio processing, and other applications. Higher-bit data can be obtained by concatenation a plurality of pieces of 8-bit data, so that the processing precision and quality can be improved.

Specifically, in this embodiment, a data width may be extended after passing through the reduction network node; and before the digital signal processing unit DSP48 performs matrix multiplication computation, a data stream inside the digital signal processing unit DSP48 may be configured by the selection signal based on the sparsity of the matrix. Therefore, the present application can flexibly support a plurality of sparsity computations.

In this embodiment, the data selector is configured to select, based on a predetermined selection signal, one of the two computation paths for output.

The data selector is configured to selectively receive and process multi-path data in the digital signal processing unit DSP48 as required to implement multi-path time-division transmission and logic control of data, thereby improving the processing efficiency and function flexibility of the digital signal processing unit DSP48. Specifically, the data selector is configured for the following:

Data selection function: The data selector may select and send one specified input signal from a set of input signals to the output end based on a given input address code, so that the digital signal processing unit DSP48 can selectively receive and process the multi-path data as required.

Data time-division transmission: In the multi-path data transmission process, the data selector may select any one of the paths as required, so that the digital signal processing unit DSP48 can implement multi-path time-division transfer and improve the data processing efficiency.

Logic control: The data selector may serve as part of the logic control and achieve a specific logic function by selecting different input signals, which is very useful in digital signal processing and can help the digital signal processing unit DSP48 to implement various complex logic operations and control.

In this embodiment, the predetermined selection signal of the data selector is determined based on a sparsity of an input matrix, a parallelism of the digital signal processing unit DSP48, and a depth of the reduction network node in the tree topology with multiple levels. It should be noted that the depth in the tree topology with multiple levels refers to a level at which the reduction network node is located in the tree topology with multiple levels.

As shown in FIG. 2, taking a computation unit including four digital signal processing units DSP48 as an example, the four digital signal processing units DSP48 include: a digital signal processing unit DSP48 0, a digital signal processing unit DSP48 1, a digital signal processing unit DSP48 2 and a digital signal processing unit DSP48 3. Computation behavior for a set of 4*4 matrix input data with a sparsity of 2:4 is as follows:

four pieces of 8-bit data A, B, C, and D from the sparse matrix are respectively sent to the input ports B of the digital signal processing unit DSP48 0, the digital signal processing unit DSP48 1, the digital signal processing unit DSP48 2, and the digital signal processing unit DSP48 3; four pieces of 8-bit data a, b, c, and d from the dense matrix are respectively sent to the input ports A of the digital signal processing unit DSP48 0, the digital signal processing unit DSP48 1, the digital signal processing unit DSP48 2, and the digital signal processing unit DSP48 3; and similarly, four pieces of 8-bit data a', b', c', and d' from the dense matrix are respectively sent to the input ports D of the digital signal processing unit DSP48 0, the digital signal processing unit DSP48 1, the digital signal processing unit DSP48 2, and the digital signal processing unit DSP48 3.

One digital signal processing unit DSP4848 can compute: (A+D)*B+C=(A*B+C1)+(D*B+C2), that is, two multiplication and addition operations, where the data of the input port A and the input port D come from different large model input sequence length (seq_len) dimensions.

An output result from an output port P of a previous stage of digital signal processing unit DSP48 is transmitted to an input port C of a next stage of digital signal processing unit DSP48.

The output result from the output port P of the digital signal processing unit DSP48 includes two parts, including an output result and 0 concatenation, which are (A*B+C1) and (D*B+C2), respectively. The two output signals of every two digital signal processing units DSP48 may be sent to a first-level concatenator, the concatenator performs zero padding on the input signal to obtain a 32-bit result, and the output result of the first-level concatenator is sent to a second-level concatenator and is concatenated into a 64-bit output result.

In this embodiment, the digital signal processing unit DSP48 computing architecture with configurable sparsity includes two parts: a runtime-reconstructible DSP cascading chain and a configurable reduction network. An addition tree of FSB can be changed to an addition chain adapted to the DSP48 structure, thereby reusing a post-adder of the DSP48 and improving hardware utilization. Meanwhile, a higher-bit sign bit extension can be changed to zero padding, thereby greatly saving resources and optimizing timing.

In the specification, a plurality of embodiments of the present disclosure are described, but for the sake of conciseness, the description of each embodiment is not exhaustive, and the same or similar feature or part between the embodiments may be omitted. In the specification, "an embodiment", "some embodiments", "example", "specific example", or "some examples" are intended to be applicable to at least one embodiment or example according to the present disclosure, instead of all embodiments. The above terms are not necessarily intended to refer to the same embodiment or example. Different embodiments or examples described in the specification, as well as features of different embodiments or examples, may be combined and combined by those skilled in the art without contradicting each other.

The example system and method of the present disclosure are specifically shown and described with reference to the above embodiments, which are examples of the best modes for implementing the system and method. It can be understood by those skilled in the art that during implementation of the system and/or method, various changes can be made to the embodiments of the system and method described herein without departing from the spirit and scope of the present disclosure as defined in the appended claims.

What is claimed is:

1. A matrix multiplication hardware architecture, comprising:
    a reduction network, comprising a tree topology with multiple levels formed by a plurality of reduction network nodes, wherein the reduction network node comprises a data selector and two computation paths; and
    a digital signal processing unit DSP48 chain, formed by cascading a plurality of digital signal processing units DSP48, wherein output ends of two adjacent digital signal processing units DSP48 are respectively connected to two computation paths of a same reduction network node in a first level of the tree topology, and outputs of two computation paths pass through a data selector and then are connected to a reduction network node in an upper level of the tree topology,
    wherein a pre-adder and a post-adder are arranged inside the digital signal processing unit DSP48, wherein a plurality of sets of logic circuits are arranged on an input side and an output side of the pre-adder, and a plurality of sets of logic circuits are arranged on an input side and an output side of the post-adder.

2. The matrix multiplication hardware architecture according to claim 1, wherein the digital signal processing unit DSP48 comprises four input ports for receiving sparse matrix data and dense matrix data, and an output port, wherein the output port is connected to an adjacent cascaded digital signal processing unit DSP48.

3. The matrix multiplication hardware architecture according to claim 2, wherein the four input ports are respectively as follows:
    an input port B, an input port A, and an input port D for receiving sparse matrix data and dense matrix data, and
    an input port C for connecting to an output end of a digital signal processing unit DSP48 in a previous stage of the digital signal processing unit DSP48 chain; and
    an output port P for connecting to an input end of a digital signal processing unit DSP48 in a next stage of the digital signal processing unit DSP48 chain.

4. The matrix multiplication hardware architecture according to claim 1, wherein the plurality of sets of logic circuits comprise:
    a logic circuit for connecting two output ports of a digital signal processing unit DSP48 and connecting to the pre-adder;
    a logic circuit for connecting another output port of a digital signal processing unit DSP48 and connecting to the post-adder which is connected to an output end of the pre-adder; and
    a logic circuit for the output ends of the digital signal processing unit DSP48.

5. The matrix multiplication hardware architecture according to claim 1, wherein the digital signal processing unit DSP48 is configured to be capable of simultaneously computing a plurality of 8-bit multiplications.

6. The matrix multiplication hardware architecture according to claim 1, wherein a parallelism of a digital signal processing unit DSP48 in the digital signal processing unit DSP48 chain is an integer multiple of 4, and each parallelism supports matrix multiplication computation with a plurality of sparsity formats.

7. The matrix multiplication hardware architecture according to claim 1, wherein the two computation paths are respectively used for an addition operation and a concatenation function of the reduction network node on input data.

8. The matrix multiplication hardware architecture according to claim 1, wherein the data selector is configured to select, based on a predetermined selection signal, one of two computation paths for output.

9. The matrix multiplication hardware architecture according to claim 1, wherein a predetermined selection signal of the data selector is determined based on a sparsity of an input matrix, a parallelism of a digital signal processing unit DSP48, and a depth of the reduction network node in the tree topology with multiple levels.

* * * * *